(12) United States Patent
Kuntz et al.

(10) Patent No.: US 10,989,650 B2
(45) Date of Patent: Apr. 27, 2021

(54) ADHESIVE FILM AND ARRANGEMENT AND METHOD FOR VERIFYING AN ADHESIVE ATTACHMENT

(71) Applicant: PREMIUM AEROTEC GMBH, Augsburg (DE)

(72) Inventors: Julian Kuntz, Augsburg (DE); Steffen Buerkner, Munich (DE); Andrey Angelov, Augsburg (DE)

(73) Assignee: PREMIUM AEROTEC GMBH, Augsburg (DE)

( * ) Notice: Subject to any disclaimer, the term of this patent is extended or adjusted under 35 U.S.C. 154(b) by 134 days.

(21) Appl. No.: 16/151,435

(22) Filed: Oct. 4, 2018

(65) Prior Publication Data
US 2019/0107480 A1    Apr. 11, 2019

(30) Foreign Application Priority Data
Oct. 5, 2017    (DE) ...................... 10 2017 217 726.8

(51) Int. Cl.
*G01N 19/04*    (2006.01)
*C09J 7/35*    (2018.01)
(Continued)

(52) U.S. Cl.
CPC .............. *G01N 19/04* (2013.01); *B32B 7/12* (2013.01); *B32B 27/18* (2013.01); *B65B 51/02* (2013.01);
(Continued)

(58) Field of Classification Search
CPC ... G01N 19/04; G01N 2203/0091; C09J 7/35; C09J 7/21; C09J 2201/61;
(Continued)

(56) References Cited

U.S. PATENT DOCUMENTS 6,004,665 A * 12/1999 Luhmann .................... C09J 7/38
428/317.3
6,026,680 A    2/2000 Mann
(Continued)

FOREIGN PATENT DOCUMENTS

DE    10 2011 008 191 A1    7/2012
DE    10 2014 111 060 A1    2/2016
(Continued)

OTHER PUBLICATIONS

German Office Action for German Application No. 10 2017 217 726.8 dated Apr. 13, 2018.
(Continued)

*Primary Examiner* — Octavia Hollington
(74) *Attorney, Agent, or Firm* — Jenkins, Wilson, Taylor & Hunt, P.A.

(57) ABSTRACT

An adhesive film and arrangement and method for verifying an adhesive attachment. A mechanical strength of adhesive film structure is matched to a target binding force of a bond produced using the film where when the film is pulled from the substrate or a material layer with peeling stress on the bond for verification of adhesive attachment, the film fails with exceedance of the mechanical strength of the structure when the strength of the bond attains or exceeds the target binding force, and the adhesive film when pulled apart does not fail when bond strength does not attain target binding force. An arrangement is disclosed for verification of adhesive attachment, having a substrate, a component bonded to the substrate by an adhesive film, and at least one test section. The test section is formed by projection of the film across an edge of the component bonded to the substrate, the projection being bonded to regions of the substrate.

14 Claims, 4 Drawing Sheets

(51) Int. Cl.
  *C09J 7/21* (2018.01)
  *B32B 7/12* (2006.01)
  *B32B 27/18* (2006.01)
  *B65B 51/02* (2006.01)

(52) U.S. Cl.
  CPC . *C09J 7/21* (2018.01); *C09J 7/35* (2018.01); *C09J 2301/304* (2020.08); *C09J 2400/263* (2013.01); *C09J 2463/00* (2013.01); *G01N 2203/0091* (2013.01)

(58) Field of Classification Search
  CPC . C09J 2400/263; C09J 2463/00; B32B 27/12; B32B 27/18; B65B 51/02
  USPC .......................................................... 73/827
  See application file for complete search history.

(56) References Cited

U.S. PATENT DOCUMENTS

| | | | | |
|---|---|---|---|---|
| 6,737,135 | B1* | 5/2004 | Luhmann | A47G 1/175 248/205.3 |
| 6,813,958 | B2* | 11/2004 | Crosby | G01N 19/04 506/12 |
| 9,885,651 | B2 | 2/2018 | Raeckers et al. | |
| 2013/0220532 | A1* | 8/2013 | Kiuchi | H01L 21/6836 156/247 |
| 2016/0139031 | A1* | 5/2016 | Landrum | G01N 19/04 73/150 A |
| 2016/0202174 | A1* | 7/2016 | Tello | G01N 19/04 73/150 A |

FOREIGN PATENT DOCUMENTS

| | | |
|---|---|---|
| JP | S62-123551 U | 8/1987 |
| JP | 2009-063363 A | 3/2009 |
| JP | 2009063363 * | 3/2009 |
| WO | WO 2007/101199 A2 | 9/2007 |

OTHER PUBLICATIONS

European Search Report for Application No. 18197846.1 dated Jul. 3, 2019.
European Search Report for Application No. 18197846.1 dated Oct. 30, 2019.

* cited by examiner

ADHESIVE FILM AND ARRANGEMENT AND METHOD FOR VERIFYING AN ADHESIVE ATTACHMENT

CROSS-REFERENCE TO RELATED APPLICATION

This application claims priority to German Patent Application DE 10 2017 217 726.8 filed Oct. 5, 2017, the entire disclosure of which is incorporated by reference herein.

TECHNICAL FIELD

The disclosure herein relates to an adhesive film for a structural adhesive bond and to an arrangement and to methods for verifying an adhesive attachment.

BACKGROUND

Although they are applicable to any adhesive bonds, the disclosure herein and the problem underlying it are elucidated hereinafter in relation to a planned bonded assembly and to a repair or refinish by adhesive bonding.

In the production of adhesive bonds, it is frequently desirable to check whether the finished adhesive bond is of sufficient quality, or in other words to check how well one bonding partner holds to the other.

For verification of assembly groups that are produced according to a construction document and hence include a planned adhesive bond, the applicant is aware of a method of testing the quality of the finished adhesive bond in which what is called a peel test is conducted on a separately manufactured sample. The conventional method entails the production of separate specimens that are then tested in a test laboratory by mechanical testing machines and with utilization, for example, of load cells. This course of action is associated with considerable expenditure of time and costs. The test result may often additionally only be available with a time delay. It would be desirable to improve this state of affairs.

Moreover, it would be desirable, for the testing of adhesive bonds in the course of repair work in which, for example, a new piece of material is bonded to a component which is already in use and is in need of repair owing to damage for instance, to have a way of testing that reliably and rapidly gives information as to whether the adhesive bond is of the required quality. For cases of refinishing executed with the aid of adhesive bonds too, a reliable and time-saving way of verification would be desirable.

SUMMARY

One problem addressed by the present disclosure is therefore that of providing a reliable and effort- and time-saving way of testing for an adhesive bond.

According to the disclosure herein, this problem is solved by an adhesive film, and/or by a method or methods, and/or by an arrangement having features disclosed herein.

What is accordingly proposed is an adhesive film for a structural adhesive bond to a substrate, where the adhesive film has a structure and where, at least in a subregion of the adhesive film, a mechanical strength of the structure has been matched to a predefined target binding force of a bond produced using the adhesive film such that, after completion of the bond, when the adhesive film is pulled away from the substrate or from a material layer with peeling stress on the bond for verification of the adhesive attachment to the substrate or to the material layer, the adhesive film fails with exceedance of the mechanical strength of the structure when the strength of the bond attains or exceeds the target binding force, and the adhesive film when pulled apart does not fail at least in the subregion when the strength of the bond does not attain the target binding force.

What is also provided is a method of verifying adhesive attachment in a structural adhesive bond to a substrate produced using an adhesive film of this kind. In this method, after completion of a bond produced using the adhesive film, for verification of adhesive attachment to the substrate and/or to a material layer, a test section is pulled away from the substrate and/or from the material layer with peeling stress on the bond. The test section is formed here by a section of the adhesive film.

An arrangement is disclosed for verification of an adhesive attachment. The arrangement has a substrate, a component bonded to the substrate by an adhesive film to form a structural adhesive bond, and at least one test section. The test section here is formed by a projection of the adhesive film that extends at least beyond part of an edge of the component bonded to the substrate. The projection is bonded to the substrate in some regions. More particularly, the adhesive film of the disclosure herein can be used in the arrangement.

A method of verifying an adhesive attachment, is additionally provided having the following steps:

arranging a substrate, a component to be bonded to the substrate and an adhesive film in such a way that a section of the adhesive film is arranged between the substrate and the component to establish a structural adhesive bond and the adhesive film extends over at least part of an edge of the component and forms a projection;

curing at least the adhesive film; and peeling off a test section formed by the projection of the adhesive film that extends at least across part of the edge of the component from the substrate.

More particularly, in the method, it is possible to use the adhesive film proposed in accordance with the disclosure herein for bonding of the component to the substrate.

The idea underlying the disclosure herein is to utilize an adhesive film itself for the verification of the durability of a bond produced by means thereof, especially to peel stress. There is no need to produce separate specimens here. The verification can be conducted without unwanted delay and with minor time demands after the production of the adhesive bond. By the disclosure herein, it is possible to verify and demonstrate the quality of the adhesive attachment to the substrate both in the case of planned bonded assemblies and in the case of repairs and refinishes.

In the case of planned adhesive bonds, with the aid of the disclosure herein, a reliable verification of quality is enabled with considerably reduced expenditure on material, personnel, time and costs, especially since the production of separate samples and wait times for laboratory results are avoided.

In the case of repairs and refinishes, the disclosure herein advantageously enables verification of the quality of the adhesive bond with improved reliability. The fact that advantageously contributes to this is that, in the disclosure herein, the testing also includes the original substrate on which the repair or refinish is being undertaken, and the same process cycle by which the actual bond implemented for the repair or refinish is being produced. For example, it becomes possible to create a way of testing with utilization of the same vacuum and/or heating setup which is used for the actual bonding. Thus, it is possible to conclude the quality of the adhesive bond from the result of the testing with improved reliability.

With the disclosure herein, it is advantageously possible to reliably verify the quality of the adhesive bond and to advantageously reduce expenditure in terms of time, material, personnel and costs in connection with the verification. If the test is successful and the quality of the adhesive bond is sufficiently good, the disclosure herein provides a nondestructive way of testing, meaning that the actual structural adhesive bond to be verified is not impaired if it has the required quality.

The test result is additionally available rapidly, which is advantageous with a view to the further processing of the bonded assembly in further steps. For example, it is possible to avoid delays in further processing owing to laboratory results that are possibly available only with a time delay.

In the case of repairs, for example on an aerospace vehicle, for instance an aircraft, the rapid availability of the test result advantageously enables shortening of the time envisaged for the repair and shortening of periods in which the aircraft remains on the ground owing to the repair.

A target binding force shall be understood in the present context more particularly to mean a minimum force that the bond has to withstand under peeling stress without failure of the bond. In other words, by the disclosure herein, it is thus possible to demonstrate whether a target binding force is attained in the manner of an attained minimum adhesion force and the bond is thus of sufficient quality, or whether, in the opposite case, the quality of the bond is insufficient and the minimum adhesion force is not attained, i.e. peeling already occurs when incident forces are too low.

The mechanical strength of the structure as to be understood in the context of the present application can be defined in many ways. For example, the mechanical strength of the structure in the present context may be a breaking strength of the structure and/or a fracture strength of the structure. The mechanical strength of the structure may, for example, be a breaking strength of the structure under tensile stress, and hence a tensile stress on the structure. However, the mechanical strength may alternatively be a breaking strength of the structure under flexural stress. Other definitions of mechanical strength are also possible.

Depending on the expected determining mode of failure by which the adhesive film under peeling stress is to fail in the case of a bond of sufficient quality, an appropriately selected mechanical strength of the structure can be matched to the target binding force. Possible modes of failure of the adhesive film include tearing under tension, but may also include, for example, mechanisms of fracture based on flexion.

Advantageous configurations and developments of the disclosure herein will be apparent from the description with reference to the figures.

In one configuration, the structure of the adhesive film takes the form of a carrier structure of the adhesive film, especially an internal carrier structure of the adhesive film. The structure having the mechanical strength to which the target binding force has been matched may thus assume further functions, for instance the provision of an adhesive layer of defined thickness for assurance of a reliable bond.

In one configuration, the carrier structure has been formed by a textile fabric, especially a nonwoven fabric or a woven fabric or a knitted fabric.

In one configuration, at least in a subarea of the adhesive film, the structure has been formed with an additional reinforcing component, where the additional reinforcing component has been applied to a starting adhesive film to form the adhesive film or has been introduced into the starting adhesive film. The mechanical strength matched to the target binding force here is a mechanical strength of the structure including the additional reinforcing component. This is advantageous if a structure of the starting adhesive film, for example an internal carrier structure of the starting adhesive film, does not have the appropriate mechanical strength and/or a support structure of the starting adhesive film can be altered only in a complex manner, if at all. The reinforcing component applied or introduced, which may be an additional carrier component, can adjust the mechanical strength of the structure. In this case, the structure thus comprises a carrier structure or component, for example an internal carrier structure or component, of the starting adhesive film that may already have been present and the additional reinforcing component, where the additional reinforcing component enables exact setting of the mechanical strength in relation to the target binding force.

In one configuration, the additional reinforcing component takes the form of a textile fabric, especially a nonwoven fabric, a woven fabric or a knitted fabric.

For example, in one configuration, the structure, at least in a subarea of the adhesive film, may have two or more carrier components that together form the structure of the adhesive film in the form of a carrier structure, where the mechanical strength matched to the target binding force is a mechanical strength of the support structure including the two or more carrier components. The carrier components may each take the form of a textile fabric, especially a nonwoven fabric or a woven fabric or a knitted fabric. In this way, adjustment of the mechanical strength by combination of the carrier components can be achieved. With a view to the expression "mechanical strength of the support structure", the same applies as was stated above in relation to the mechanical strength of the structure.

In one configuration, the adhesive film includes a curable adhesive which may especially include an epoxy resin.

In one configuration of the adhesive film, it may be designed for peeling removal from the substrate and the material layer, and the mechanical strength of the structure may be adjusted for the verification of the adhesive attachment to the substrate and to the material layer.

In one configuration, a mechanical strength of the test section at least in a subregion of the test section is matched to a predefined target binding force of a bond produced using the adhesive film such that, after completion of the bond, when the test section is pulled away from the substrate with peeling stress on the bond, the test section breaks off with exceedance of the mechanical strength thereof when the strength of the bond attains or exceeds the target binding force, and the test section when pulled apart does not break off at least in the subregion when the strength of the bond does not attain the target binding force. Thus, it is possible to test the quality of the bond quickly and easily.

The mechanical strength of the test section can, analogously to the statements made above with regard to the term "mechanical strength of the structure", be defined in many ways. For example, the mechanical strength of the test section may be a breaking strength thereof and/or a fracture strength thereof. The mechanical strength of the test section could thus, for example, be a breaking strength of the test section under tensile stress, and hence a tensile strength of the test section. However, the mechanical strength may alternatively, for example, be a flexural strength of the test section under flexural stress. Other definitions of mechanical stress are also possible in the case of the test section.

With regard to the terminology of "breaking off" of the test section used here, it should be noted that this term in the present context is intended to encompass both, in particular, tearing under tension and, for example, breaking, for instance under flexion, or some other failure of the test section that leads to removal of part thereof, or any combination thereof.

In one configuration, the adhesive film has a structure, where, at least in the subregion of the test section, a mechanical strength of the structure has been matched to the target binding force of the bond produced using the adhesive film, such that, when the test section is pulled away, the adhesive film fails with exceedance of the mechanical strength of the structure when the strength of the bond attains or exceeds the target binding force, and the adhesive film when pulled apart does not fail at least in the subregion when the strength of the bond does not attain the target binding force. In this way, the mechanical strength of the test section can advantageously be adjusted by suitable formation of the adhesive film and matched to the target binding force.

In one configuration, the arrangement also has an intermediate element spaced apart from the edge of the component bonded to the substrate. The projection extends across regions of the intermediate element in such a way that the intermediate element is present in regions between the projection and the substrate, where the projection is bonded to the substrate between the edge of the component bonded to the substrate and the intermediate element. Between the intermediate element and the edge of the component, there is thus a bonded region of the projection that can be put under load for test purposes without damaging the actual adhesive bond of component and substrate. When the test section is pulled away, the intermediate element advantageously ensures an initial tear and, after detachment of the test section from the intermediate element, provides a means of gripping the test section manually or by a tool or a device.

More particularly, in one development, the projection can advantageously end at the intermediate element. This further improves the handling of the test section.

Preferably, the projection is readily detachable from the intermediate element. This too facilitates and accelerates the handling of the test section.

In one configuration, an additional reinforcing component is provided in at least a first subarea of the test section. In this way, the mechanical strength of the test section can be influenced in an effective manner.

In one configuration, the additional reinforcing component takes the form of part of the structure of the adhesive film, where the mechanical strength of the structure matched to the target binding force is a mechanical strength of the structure including the additional reinforcing component. The advantages of the additional reinforcing component have already been cited above.

In one development, the first subarea ends between the intermediate element and the component bonded to the substrate before reaching the component bonded to the substrate. Thus, an intended break site is provided, at or close to which the test section is to break off, when the adhesive attachment is sufficient. If, by contrast, it is broken off only after the end of the first subarea where the reinforcing component is no longer present in the test section, it is possible to conclude that the strength of the bond is too low.

In one development, the first subarea overlaps with at least sections of the intermediate element and extends across a section of an edge of the intermediate element. It is thus possible to ensure that, when it is pulled away, forces are applied effectively to the reinforced first subarea of the test section.

In one configuration, an additional material layer with elevated breaking strength has been disposed in a second subarea of the test section on the projection. With this configuration, it is possible not only to verify the strength of the bond in the sense of the binding force, but also to study the fracture profile and hence the mode of failure of the bond. The additional material layer of elevated breaking strength ensures that the bond of the test section breaks off at regions of the bond surface, the test section thus peels off there intentionally in regions and reveals a surface profile of the breaking area. The type of failure may be examined, for example, with the aid of a surface structure of the bonding partner that has been produced, for instance, by surface grinding or pulling off a peel ply prior to the bonding.

More particularly, in one development, a breaking strength of the additional material layer is sufficiently great that the test section in the second subarea does not break up even at the maximum force which is applied when the projection is pulled away.

In one development, the second subarea ends between the intermediate element and the component bonded to the substrate before reaching the component bonded to the substrate. What can be achieved in this way is that the binding force can also be tested in addition to the study of the fracture profile.

More particularly, in one development, the second subarea overlaps at least with sections of the intermediate element and in this case extends across a section of an edge of the intermediate element. In this configuration too, it is possible to ensure that, when the components are pulled apart, forces are applied effectively to the second subarea of the test section provided with the additional material layer and the bond reliably breaks in the intended area.

In a further configuration, the first subarea overlaps with sections of the second subarea, extends across one end of the second subarea and ends between the end of the second subarea and the adhesive-bonded component before reaching the adhesive-bonded component. In this case, advantageously in combination, it is possible both to study the fracture profile and the sustainable force under peeling stress. If the bond is of good quality, the test section breaks off at an intended fracture site in the region of the end of the second subarea, where the reinforcing component is present and the mechanical strength of the test section is set in a defined manner for the assessment of the binding force of the bond. If the bond, by contrast, is not of sufficient quality, the test section only fails as a result of breaking-through or breaking-off at the end of the first subarea, or there is even tearing of the bond down to the region of the component bonded to the substrate. In the case of a good bond, the component and the adhesive bond thereof to the substrate are not damaged.

In one configuration, a mechanical strength of the test section at least in a subregion of the test section can be matched to a predefined target binding force of the bond produced using the adhesive film such that, after completion of the bond, when the test section is pulled away from the additional material layer with peeling stress on the bond, the test section breaks off with exceedance of the mechanical strength thereof when the strength of the bond attains or exceeds the target binding force, and the test section when pulled apart does not break off at least in this subregion when the strength of the bond does not attain the target binding force. In this case, it may again be the case that, at least in this subregion of the test section, a mechanical strength of the structure has been matched to the target binding force in such a way that, when the test section is pulled away from the additional material layer, the adhesive film fails with exceedance of the mechanical strength of the structure when the strength of the bond attains or exceeds the target binding force, and the adhesive film when pulled apart does not fail at least in the subregion when the strength of the bond does not attain the target binding force. For adjustment of the mechanical strength in this subregion for examination of the adhesive attachment with respect to the additional material layer, it is especially possible to provide a further, additional reinforcing component in a third subarea of the test section.

In one configuration, the arrangement also has a further intermediate element spaced apart from the edge of the component bonded to the substrate. The projection extends here in regions between the intermediate element and the further intermediate element. In this way, it is possible to further extend testing for the adhesive attachment, especially when the additional material layer has been provided.

In a further configuration, the further intermediate element may take the form of a film, especially of a release film. Preferably, the projection is readily detachable from the further intermediate element.

Preferably, in one configuration, the further intermediate element extends between a section of the projection and a section of the additional material layer.

In a further development, the projection is bonded to the additional material layer in a region between an edge of the intermediate element facing the component and an edge of the further intermediate element facing the component. This advantageously enables testing of the adhesive attachment to the additional material layer. In this development, the further intermediate element advantageously ensures an initial tear and a holding means.

In one configuration, at least in a third subarea of the test section, a further, additional reinforcing component is provided, where the third subarea differs from the first subarea. In this way, the mechanical strength of the test section can be influenced in an effective manner in a further area. The additional reinforcing component may likewise, for example, take the form of a textile fabric, especially a nonwoven fabric, a woven fabric or a knitted fabric.

In one configuration, the further, additional reinforcing component takes the form of part of the structure of the adhesive film, where the mechanical strength of the structure matched to the target binding force in the third subarea is a mechanical strength of the structure including the further, additional reinforcing component.

In one development, the further, additional reinforcing component may be disposed between the adhesive film and the intermediate element.

In one development, the third subarea ends between the edge of the further intermediate element facing the component and the edge of the intermediate element facing the component. Thus, a further intended fracture site is created, at or close to which the test section is to break off when the adhesive attachment to the additional material layer is sufficient.

In one development, the second subarea in which the additional material layer is disposed thus overlaps with at least sections of the third subarea.

In one configuration, the arrangement may have multiple, for example, test sections, each of which takes the form of a projection of the adhesive film. For example, one projection on each of opposite sides of the component, for formation of a test section in each case, may extend beyond an assigned part of the edge of the component. For example, it is possible here, for still further improvement in the reliability of the testing of the adhesive attachment, for it to be tested more than once, for example twice, with the aid of multiple test sections. The multiple test sections may especially be designed in an equivalent manner, with the exception of the arrangement thereof relative to the component.

In a further configuration, the intermediate element takes the form of a film, especially of a release film. Thus, firm adhesion and bonding of the projection in the region of the intermediate element is avoided.

In one configuration, the component bonded to the substrate has been formed by a laminate or by a laminate ply.

In a further configuration, the component bonded to the substrate has been formed by a fiber composite material, especially a fiber-reinforced polymer material, having a matrix and reinforcing fibers.

In one development, the component to be bonded to the substrate has already cured before the bond is produced using the adhesive film, where, in this case, if the additional material layer has been provided in the second subarea, the additional material layer has also already cured.

In a preferred embodiment, however, the component to be bonded to the substrate is as yet uncured or incompletely cured prior to the production of the bond, where the component is cured, for example, during the curing of the adhesive film. In this configuration, if the additional material layer has been provided in the second subarea, the additional material layer is likewise uncured or incompletely cured, preferably in the same way as the component to be bonded to the substrate.

In one configuration, the additional material layer takes the form of a fiber-reinforced material layer, especially formed by a fiber-reinforced polymer material.

In one configuration, the additional material layer takes the form of a ply of a laminate, where the additional material layer preferably takes the same form as a material layer of the adhesive-bonded component. This can further improve, for example, the meaningfulness of the study of the fracture profile which is produced when the test section is pulled away.

In one configuration, the substrate has been formed by a fiber composite material, especially a fiber-reinforced polymer material, having a matrix and reinforcing fibers.

In a preferred configuration, the substrate has already cured before the bond is produced using the adhesive film. The substrate may thus be in the form of an already cured fiber composite component. Alternatively, however, the substrate could instead still be uncured or incompletely cured, and further curing thereof could be effected, for example, during the curing of the adhesive film.

In further configurations, the substrate and/or the component bonded to the substrate and/or the additional material layer have carbon fibers or glass fibers as reinforcing fibers.

Especially when the component to be bonded to the substrate and the substrate are each already cured, in one configuration, the component to be bonded to the substrate and the substrate are each pretreated prior to the production of the bond. This can be undertaken, for example, by surface grinding, by pulling off a pull-off fabric, by sandblasting or by plasma activation. In this configuration, the pretreatment of the substrate is also conducted in the region thereof in which the projection is bonded to the substrate. In this way, it is again ensured that the test result gives reliable information about the actual bond between the component and the substrate. If, in one variant of this configuration, a likewise already cured additional material layer is provided in the second subarea, this is likewise preferably pretreated in the same way as the component to be bonded.

In one configuration, the test section is pulled off the substrate by hand or using tongs or using a roller device. Pulling-off by hand or by tongs enables a simple test of the adhesive attachment, while the utilization of a device for pulling-off enables a test procedure defined in an improved manner.

In one configuration, after the test section has been peeled off the substrate and the test section has been torn off at the same time, part of the projection remaining in the torn-off piece of the test section, especially after detachment thereof from the further intermediate element, is peeled off the additional material layer likewise remaining in the torn-off piece. In this case, the remaining part of the projection may preferably include the further, additional reinforcing component if it has been provided in the third subarea of the test section. In this way, verification of the binding force to the additional material layer is advantageously possible, which enables conclusions as to the adhesive attachment between adhesive film and component. This may be advantageous specifically in the case of an already cured component.

In an advantageous configuration, the disclosure herein may be applied to planned adhesive bonds, especially in the production of fiber composite components. For example, it becomes possible with the aid of the disclosure herein to test the quality of a planned bonded assembly in which, for instance, a component part as component is to be bonded to the substrate, in a quicker and simpler manner. The expenditure in terms of time and costs for the production of separate samples and for laboratory studies thereon can be reduced.

In another configuration, the disclosure herein can advantageously find use on adhesive bonds for repairs or structural refinishes, especially on fiber composite components. Verification of the bond is thus also enabled with the aid of the disclosure herein in situations in which such testing was difficult before.

The curing of the adhesive film including the projection can, in an illustrative configuration, be effected under a vacuum setup, for example with local heating, especially for a repair or a refinish.

In one configuration, the substrate, before the production of the bond, is subjected to surface processing, for example by grinding, for example for removal of a lightning guard. A lightning guard of this kind may be provided, for example, in fiber composite components for aerospace vehicles, for instance aircraft. In this configuration, the substrate is subjected to surface treatment not just in the region in which the component is to be bonded to the substrate but also in the region in which the projection of the adhesive film is bonded to the substrate. In this way, it is in turn possible to ensure that the result of the test gives a good reflection of the conditions in the region of the actual adhesive bond of the component to the substrate. More particularly, the equivalent prior surface processing of the substrate in the region of the component to be bonded and in the region of the projection that forms the test section creates comparable conditions for the bond. This configuration may advantageously find use especially in repair operations on the substrate, for example by a component formed by a laminate or laminate plies.

In configurations, the disclosure herein may advantageously find use in the field of aerospace, especially in the production and/or repair of aerospace vehicles, for example aircraft.

It will be apparent that, when the component bonded to the substrate is mentioned in the above-described configurations and developments, this bonded component in corresponding method configurations of the disclosure herein corresponds to the component to be bonded to the substrate, and vice versa. Configurations described in connection with the arrangement or the adhesive film are likewise correspondingly applicable to the methods.

The above configurations and developments can be combined with one another in any meaningful combination. Further possible configurations, developments and implementations of the disclosure herein also include combinations of features of the disclosure herein that have been described above or hereinafter with regard to the working examples that have not been specified explicitly. More particularly, the person skilled in the art will also add on individual aspects as improvements or additions to the respective basic form of the present disclosure.

BRIEF DESCRIPTION OF THE DRAWINGS

The disclosure herein is elucidated in detail hereinafter with reference to the working examples specified in the schematic figures. In the example figures.

DETAILED DESCRIPTION

Figure 1:
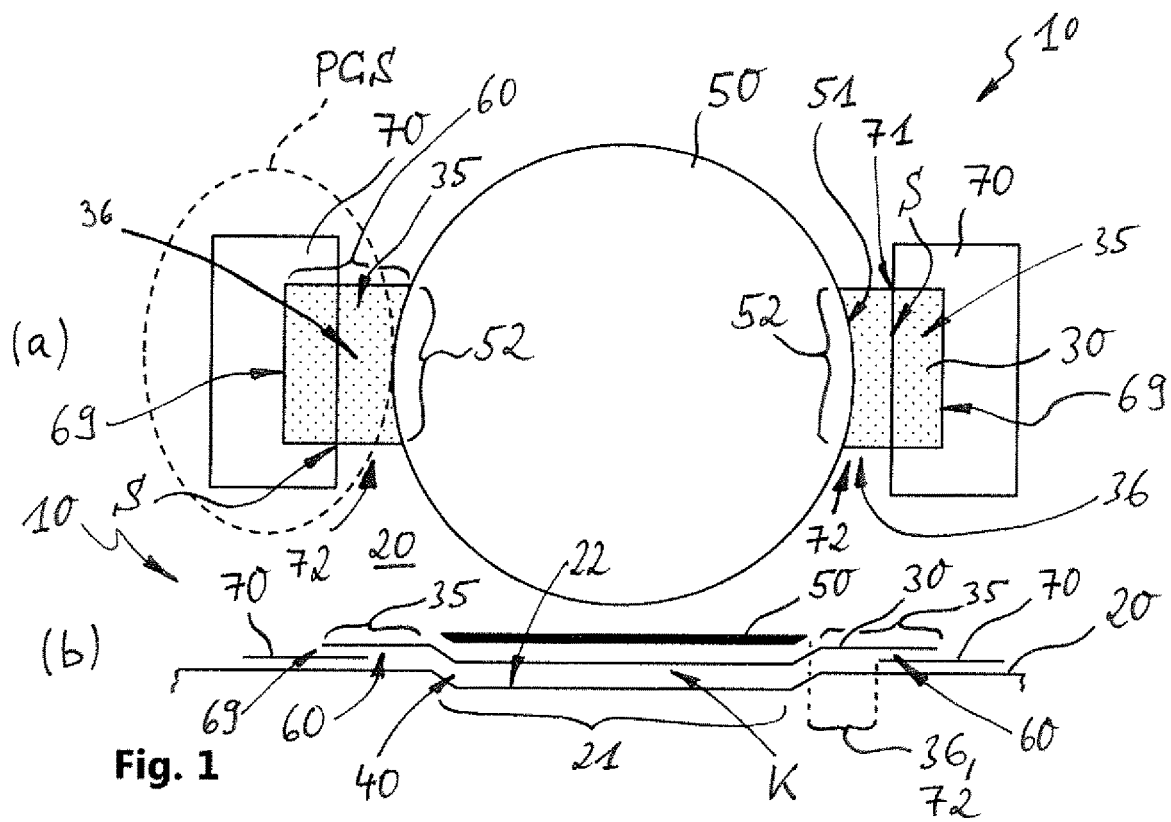
FIG. 1 is a top view (a) and a section view (b) of an arrangement in a first working example of the disclosure herein.

The appended figures are intended to impart further understanding of the embodiments of the disclosure herein. They illustrate embodiments and serve to elucidate principles and concepts of the disclosure herein in connection with the description. Other embodiments and many of the advantages mentioned will be apparent with regard to the drawings. The elements of the drawings are not necessarily to scale with respect to one another.

In the figures, elements, features and components that are identical, have the same function and the same effect—unless stated otherwise—are each given the same reference numerals.

FIG. 1 shows an arrangement 10 for verifying an adhesive attachment in a first working example. A component 50 has been bonded to a substrate 20, where, in FIG. 1, component 50 has been bonded by way of example to the upper surface 22 of the substrate 20 in FIG. 1. The bonding of component 50 to substrate 20 was achieved in the arrangement 10 by an adhesive film 30. For this purpose, the adhesive film 30 was disposed between component 50 and substrate 20. Thus, by the adhesive film 30 a structural adhesive bond 40 has been formed between component 50 and substrate 20.

Substrate 20 in the first working example is, by way of example, a fiber composite component which is to be repaired in an aerospace vehicle, for example an aircraft. Substrate 20 has been formed by a fiber composite material, especially a fiber-reinforced polymer material, having a matrix and reinforcing fibers. The matrix may be formed, for example, by an epoxy resin, and the reinforcing fibers provided may be carbon fibers or glass fibers.

In an area 21 for accommodation of component 50 in the form of a repair "patch", the substrate 20 has been provided with a flat recess that has preferably been introduced by grinding. The recess in the area 21 is of a size corresponding to the size of component 50 and enables the accommodation of component 50 together with the adhesive film 30, for example in such a way that component 50 does not protrude significantly above the surface of substrate 20, if at all, at the side of component 50. Component 50 in FIG. 1 has been provided with a taper by way of example in the region of an edge 51 of component 50. In the first working example, component 50 is circular, but may be differently shaped in variants.

The adhesive film 30 extends along both sides of component 50 across an assigned part 52 of the edge 51 of component 50 in each case, as a result of which a projection 35 in the form of a strip of the adhesive film 30 has been formed in the region of each of the opposite sides of component 50.

The arrangement 10 also has two intermediate elements 70 disposed on the substrate 20. Component 50 is disposed between the intermediate elements 70, by way of example in about the middle in FIG. 1, in such a way that each of the intermediate elements 70 is spaced apart from the edge 51. A gap 72 has thus been provided between each of the intermediate elements 70 and component 50. The projection 35 extends in each case by its distal end, viewed from the component 50, over regions of the intermediate element 70, where the projection 35 ends in each case at the assigned intermediate element 70. The intermediate element 70 is in regions in each case between the assigned projection 35 and the substrate 20. Between the edge 51 of the component 50 and the assigned intermediate element 70, the projection 35 has been bonded to the substrate 20 in each case in a region 36 thereof. In FIG. 1, each projection 35 as a section of the adhesive film 30 forms a test section 60 that ends on the intermediate element 70 at an end 69.

The adhesive film 30 has an adhesive and an internal support structure not shown in FIG. 1, which may be formed by a textile fabric, especially a nonwoven fabric, a woven fabric or a knitted fabric. The support structure enables appropriate handling of the adhesive film 30 and ensures that the adhesive film 30 still retains a minimum thickness even when pressure is applied thereto. In this way, a sufficient thickness of an adhesive layer is ensured. The adhesive may be a curable adhesive, including an epoxy resin, for example.

A mechanical strength of the support structure, in the adhesive film 30 overall, has been matched to a predefined target binding force of a bond K produced using the adhesive film 30 to form the structural adhesive bond 40. The matching has been done in such a way that—after completion of the bond K—when the adhesive film 30 is pulled away from substrate 20 by peeling stress on the bond K for verification of the adhesive attachment to the substrate 20, the adhesive film 30, comprising the support structure and the adhesive, fails with exceedance of the mechanical strength of the support structure in combination with the adhesive when the strength of the bond K attains or exceeds the target binding force. However, the adhesive film 30 does not fail, i.e. does not break off, when the strength of the bond K does not attain the target binding force—in this case there is continued peeling-off of the adhesive film 30.

The mechanical strength may, for example, be a breaking strength or tensile strength of the support structure which may be selected in such a way that the support structure of the adhesive film 30 and hence the adhesive film 30 fail on attainment or exceedance of the target binding force. In variants, the adhesive film 30 may, however fail under the action of fracture mechanisms that are active in the combination of adhesive and support structure present in the adhesive film 30 and derive, for example, from bending, when the target binding force of the bond K is attained or exceeded. In such a case, the matched mechanical strength may be a fracture strength or flexural strength or a differently defined mechanical strength.

In order to complete the bond K, after the intermediate elements 70, the adhesive film 30 and the component 50 have been disposed on the substrate 20, the adhesive film 30 is cured. In the first working example, component 50 is preferably uncured or incompletely cured, such that it likewise cures or cures further in the curing of the adhesive film 30. The curing can be effected, for example, under a vacuum setup with local heating. In one variant of the first working example, component 50, however, may already have cured before the adhesive film 30 is arranged between component 50 and substrate 20 and the adhesive film 30 is cured.

In order subsequently to test the adhesive attachment in the region of the bond K, after completion of the bond K, the test section 60 is detached from the intermediate element 70 at its end 69 and pulled away from the substrate 20 with peeling stress on the bond K. In this way, the bond K is stressed for testing purposes in the region 36. With the aid of the intermediate element 70, for this purpose, an initial crack is provided, and the detachment of the end 69 is additionally enabled in order to be able to grip the test section 60 at its end 69. The intermediate element 70 in each case takes the form of a release film, as a result of which the projection 35 is readily detachable from the intermediate element 70 at the end 69 of the test section 60.

Figure 5:
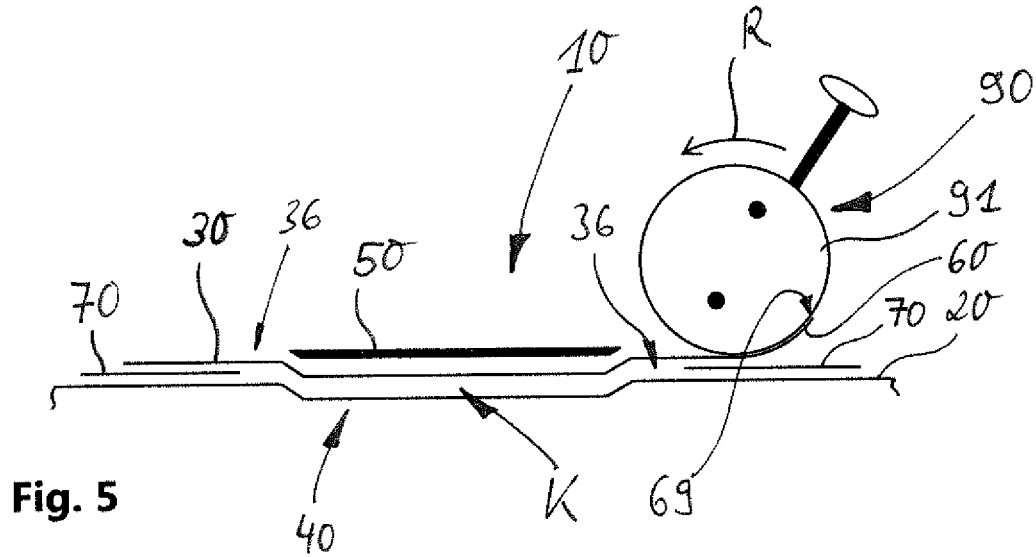
FIG. 5 is an illustrative step of peeling-off a test section in an arrangement according to the first working example by a rolling device, shown in a section view of the arrangement.

The pulling-away of the test section 60 is shown in schematic form for the first working example in FIG. 5 and is effected essentially at right angles to component 50. Peeling forces are generated here that stress the bond K. In FIG. 5 a force is applied to pull away the test section 60 by a roller device 90. In this case, the end 69 of the test section 60 can be held at the circumference of a roller body 91 of the roller device 90 and pulled away with rotation of the roller body 91, indicated in FIG. 5 by the arrow R. Alternatively, it is possible to grip the end 69 of the test section 60 by hand or by tongs (not shown) and to pull away the test section 60.

With the aid of the adhesive film 30, in the arrangement 10, the mechanical strength of the test section 60 is adjusted in such a way that the test section 60 breaks off with exceedance of the mechanical strength thereof, for example a tear strength and/or breaking strength, when the binding force of the bond K is sufficiently great and hence attains or exceeds a predefined target binding force. Since the test section 60, given sufficient quality of the bond K, already breaks off before reaching component 50, and preferably already breaks off at an intended break site or intended fracture site S at or close to an edge 71 of the intermediate element 70, the adhesive bond 40 of substrate 20 and component 50 is not impaired when the bond K is sufficiently good. The edge 71, viewed from component 50, is a proximal edge of the intermediate element 70. However, the test section 60 does not break off at the intended break site S when the binding force of the bond K is too low and the target binding force is therefore not attained, but continues to peel off in the region 36.

The utilization of the adhesive film 30 for the verification of adhesive attachment in the region of the bond K enables simple verification as to whether the predefined target binding force is attained, and avoids the production of separate samples and waiting for laboratory results. Moreover, testing by the test section 60 involves the substrate 20, i.e., in the case of the repair shown in FIG. 1, the fiber composite component already in use, and its previous history. The test section 60 with the projection 35 is also subjected to the same method steps as executed for production of the bond K of component 50 to the substrate 20. The test result thus enables, in an improved manner, a conclusion as to the quality of the adhesive bond 40.

In the first working example, demonstration of adhesive attachment is thus enabled by a projection 35 which forms a test section 60, and the mechanical strength of which is matched to the minimum adhesion force of the bond K. A simple, rapid test of the adhesive attachment between the surface 22 of the substrate 20 and the component 50 is possible by the adhesive film 30.

The test section 60 with the intermediate element 70 in FIG. 1 can also be referred to as a "process control specimen" or "PCS". In the Figures, one of these process control specimens in each case is emphasized with the aid of a dotted line. In the first working example, two equivalent test sections 60 and hence two PCSs are provided. The adhesive attachment can thus be tested twice for even further improvement of the reliability of the test.

In the first working example, component 50 takes the form of a laminate. Component 50 has been formed by a fiber composite material having multiple laminate plies. The fiber composite material in the first working example is preferably a fiber-reinforced polymer material having a curable matrix and having reinforcing fibers. The matrix may especially be formed by an epoxy resin, and the reinforcing fibers may especially be carbon fibers or glass fibers.

In the first working example, substrate 20 is repaired by bonding component 50 to it; substrate 20 is therefore already in cured form prior to production of the bond K and may already have been in use.

Both substrate 20 and component 50 may be manufactured or have been manufactured using a preimpregnated semifinished fiber product (prepreg) or alternatively, for example, by the resin infusion method with a dry semifinished fiber product. Therefore, the component 50 to be bonded may have been formed from multiple layers of a prepreg, or may alternatively have been formed by plies of a dry semifinished fiber product that are impregnated by the resin infusion method. When the adhesive film 30 is laid onto the substrate 20 and the intermediate elements 70, it may especially have been frozen.

Figure 2:
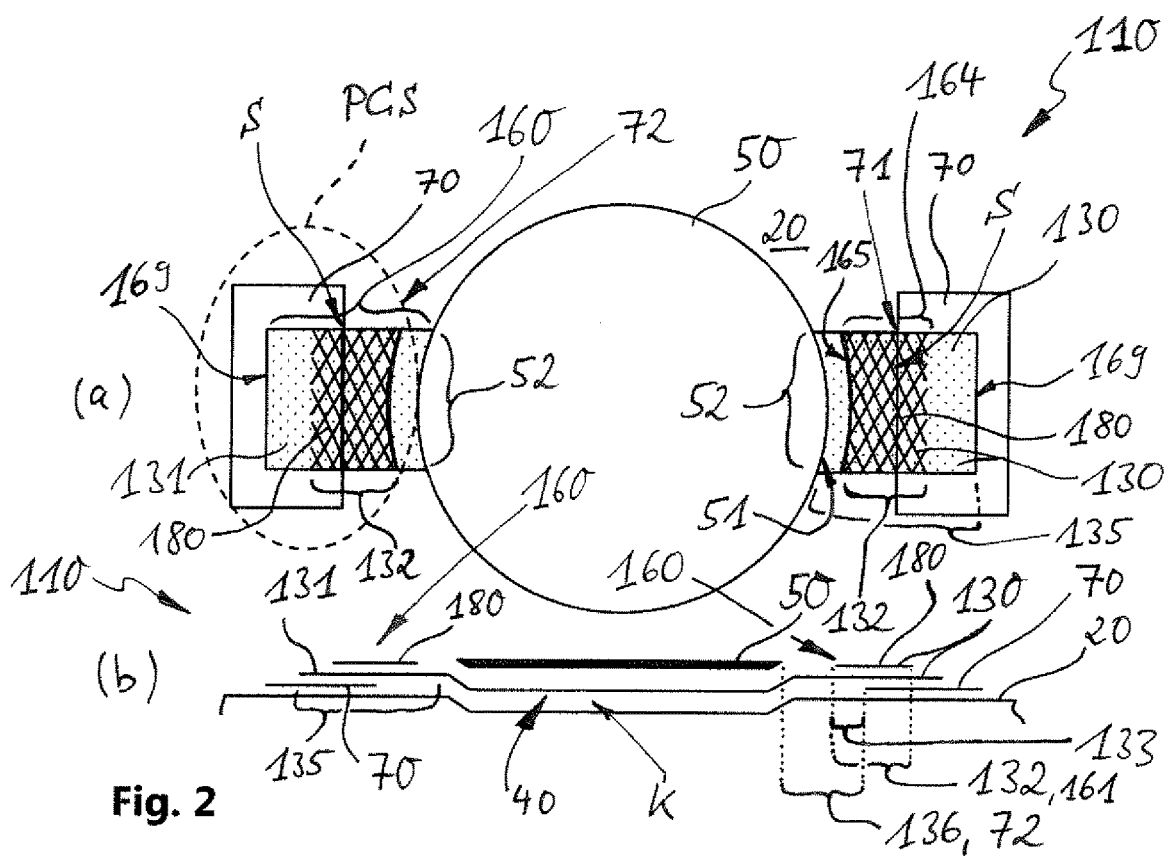
FIG. 2 is a top view (a) and a section view (b) of an arrangement in a second working example of the disclosure herein.

An arrangement 110 according to a second working example is shown by FIG. 2. The differences in the second working example from the first working example are to be described hereinafter, with additional reference to the above remarks relating to the first working example.

The arrangement 110 has a substrate 20, a component 50, two intermediate elements 70 and an adhesive film 130. By the adhesive film 130, a structural adhesive bond 40 from component 50 to the substrate 20 has been formed. The arrangement 110 also has two identical test sections 160. The test sections 160 have each been formed by a projection 135 of the adhesive film 130, with each of the projections 135 extending beyond an assigned part 52 of an edge 51 of component 50.

Each of the projections 135 extends by its distal end, viewed from component 50, over regions of the intermediate element 70 and ends at the assigned intermediate element 70. Between the edge 51 and the assigned intermediate element 70, the projection 135 has in each case been bonded to the substrate 20 in a region 136 thereof. The test sections 160 each end in FIG. 2 at an end 169 on the intermediate element 70.

The differences in the adhesive film 130 from the adhesive film 30 are elucidated hereinafter. The adhesive film 130 has a subarea 132 in the region of each of the projections 135. A structure of the adhesive film 130 comprises an internal support structure (not shown in the Figures) which forms part of a starting adhesive film 131 but also includes the adhesive. In addition, the structure of the adhesive film 130 has an additional reinforcing component 180 applied to the starting adhesive film 131 in the subarea 132. Alternatively, the reinforcing component 180 could have been introduced into the starting adhesive film 131.

In the second working example, a mechanical strength of the structure comprising the additional reinforcing component 180 has been matched to a predefined target binding force of a bond K produced with the adhesive film 130 to form the adhesive bond 40 in such a way that—after completion of the bond K—when the adhesive film 130 is pulled away from substrate 20 with peeling stress on the bond K, the adhesive film 130 fails in a subregion 133 and preferably at the start thereof close to the edge 71 when the strength of the bond K attains or exceeds the target binding force. However, the adhesive film 130, and especially the support structure, does not fail in the subregion 133 when the strength of the bond K does not attain the target binding force, and there is instead peeling in the region 133. The subregion 133 of the adhesive film 130 is formed by that part of the subarea 132 in which the projection 135 has been bonded to the substrate 20; see FIG. 2. In the second working example, the mechanical strength of the structure of the adhesive film 130 in subarea 132 has thus been modified by addition of the reinforcing component 180 having predeterminable mechanical strength in order to achieve the desired matching to the target binding force. The reinforcing component 180 can be regarded as an additional carrier component, in which case the adhesive film 130 in subarea 132 has two carrier components: the internal carrier component of the starting adhesive film 131 and the additional reinforcing component 180.

In the second working example, additional reinforcing component 180 has been formed by a textile fabric, especially a nonwoven fabric, a woven fabric or a knitted fabric. The internal support structure of the starting adhesive film 131 (not shown) has also preferably been formed by a textile fabric, especially a nonwoven fabric, a woven fabric or a knitted fabric.

FIG. 2 also shows that, in the second working example, the additional reinforcing component 180 has thus been provided in a subarea 164 of the test section 160, as a result of which, in the manner described above, the mechanical strength of the test section 160 has been adjusted in subarea 164. In the second working example, the subarea 164 of the test section 160 ends between the intermediate element 70 assigned to the test section 160 and component 50 before reaching component 50 in an end 165.

With the aid of the reinforcement of the bond structure by the additional reinforcing component 180, it is thus possible to accurately determine what force has to be withstood in the testing of the bond K by the test section 160 in a subregion 161 of the test section 160 that corresponds to the subarea 164 in order to demonstrate sufficient bond quality. In this case, given a good bond K, there is an intended break site or intended fracture site S in the reinforced subarea 164, at or close to the edge 71, and hence also before component 50. If the test section 160 tears off in the peeling removal only at or after the end 165 of the subarea 164 where the reinforcing component 180 is no longer present, or there is even progression of a tear into component 50, it is not possible to conclude that the bond is of adequate quality. The effect of the reinforcing component 180 is thus that, in the case of a poor bond K, the test section 160 breaks off only shortly before component 50 or a tear of the bond K is continued into component 50.

In FIG. 2, subarea 164 of the test section 160 overlaps with sections of the assigned intermediate element 70, as a result of which subarea 164 extends across a section of an edge 71 of the intermediate element 70. The forces to be introduced to pull the test section 160 away, e.g. tensile forces, are thus introduced effectively into the reinforced subarea 164.

In variants of the second working example, it would be possible to adjust the test section 160 in an appropriate manner with regard to its mechanical strength by addition of multiple additional reinforcing components 180.

Figure 3:
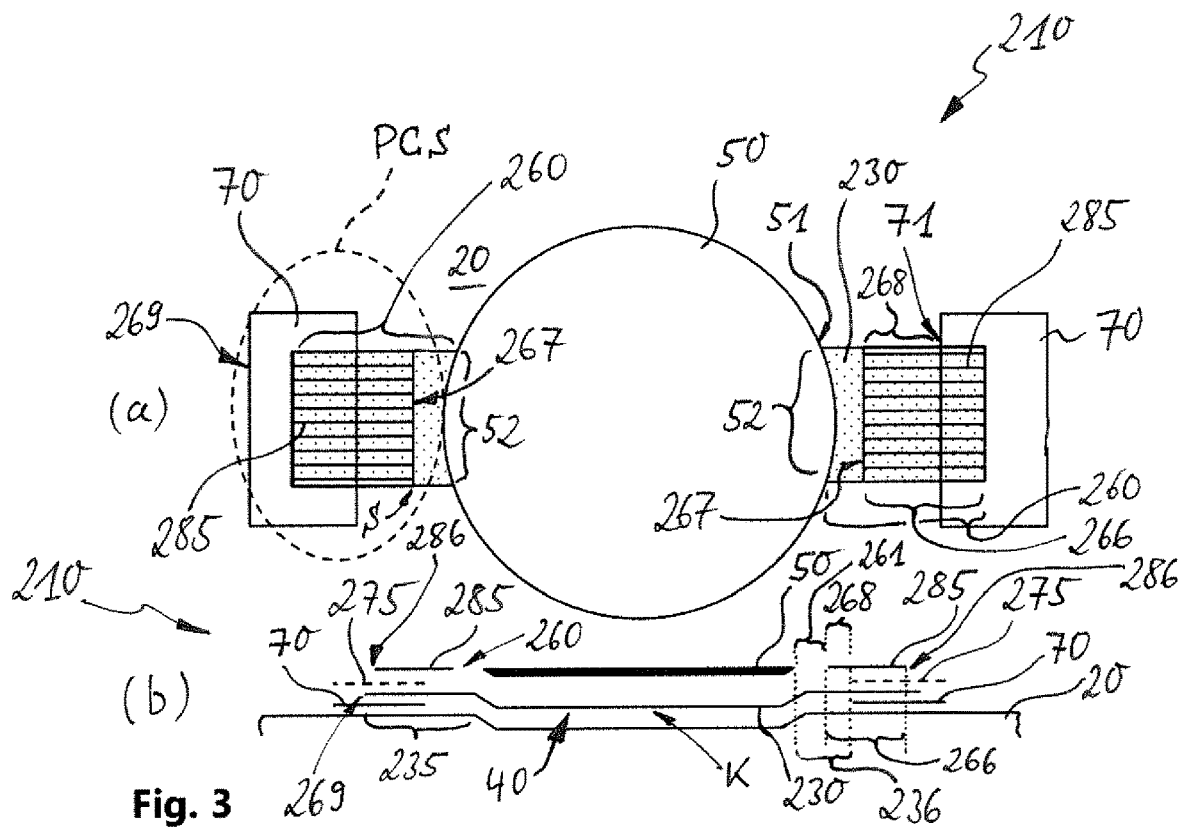
FIG. 3 is a top view (a) and a section view (b) of an arrangement in a third working example of the disclosure herein.

An arrangement 210 according to a third working example is shown in FIG. 3. The differences in the third working example from the first working example are to be described hereinafter, with additional reference to the above remarks relating to the first working example.

The arrangement 210 has a substrate 20, a component 50, two intermediate elements 70 and an adhesive film 230. By the adhesive film 230, a structural adhesive bond 40 of component 50 to substrate 20 has been formed. The arrangement 210 also has two identical test sections 260. The test sections 260 have each been formed by a projection 235 of the adhesive film 230, with each of the projections 235 extending across part 52 of an edge 51 of component 50.

Each of the projections 235 extends by its distal end, viewed from component 50, over regions of the intermediate element 70 and ends at the assigned intermediate element 70. Between the edge 51 and the assigned intermediate element 70, the projection 235 has been bonded to the substrate 20 in each case in a region 236 thereof. The test sections 260 in FIG. 3 each end at an end 269 on the intermediate element 70.

In the third working example, the adhesive film 230 is of the same design as the adhesive film 30 in the first working example, and so reference may be made in this regard to the above remarks. However, the construction of the test section 260 differs from that of the test sections 60 and is described hereinafter.

In FIG. 3, an additional material layer or ply 285 with elevated breaking strength has been disposed on the projection 235 in a subarea 266 of the test section 260 in each case. On curing of the adhesive film 230, the projection 235 also adheres to regions of the material layer 285. If the test section 260 is pulled away from the substrate 20 with peeling stress on the bond K, the bond K first breaks after the test section 260 has been lifted away from the intermediate element 70, as a result of which the fracture profile becomes visible and can be examined. In this way, it advantageously becomes possible, without damaging the structural adhesive bond 40, to examine the area between substrate 20 and adhesive film 230 and to check the mode of failure under which the bond K fails in the test and to verify whether this is permissible under the given conditions or not. Because the mechanical strength of the test section 260 is increased with the aid of the additional material layer 285 to such an extent that the test section 260 is not severed in subarea 266 even under the maximum force which is applied in the test, it is possible, in a subregion 268 of the test section 260 in which the projection 235 has been bonded to the substrate 20 and the additional material layer 285 is at the same time present, to produce a surface profile of the break area and examine it subsequently.

In the third working example, the additional material layer 285 takes the form of a laminate ply with a fiber-reinforced polymer material. Advantageously, the additional material layer takes the same form as a ply of component 50 that comes into contact with the adhesive film 230. Thus, the additional material layer 285 also has a matrix and reinforcing fibers, the matrix having been formed from a curable polymer material and the reinforcing fibers present being, for example, carbon fibers or glass fibers. The additional material layer 285 can thus be referred to as a reinforced laminate strip.

Analogously to the first working example, in the third working example as well, component 50 is preferably uncured or incompletely cured. In this case, the additional material layer 285 is likewise uncured or incompletely cured and, prior to production of the bond K, is preferably in the same state of curing as component 50. If, in one variant, component 50 has already cured, the additional material layer 285 in the third working example has also already cured.

The subarea 266 ends with one end 267 thereof in FIG. 3 between the intermediate element 70 and component 50 before reaching component 50. Thus, between the end 267 and the edge 51, there remains a subregion 261 of the test section 260 in which, analogously to the above-described first working example, the adhesive attachment can be tested for the attainment of the target binding force. In this case, there is an intended tear site or intended fracture site S, in the presence of a sufficient binding force of the bond K, at or close to the edge 267 in the subregion 261. The third working example can thus test two criteria in order to assess the quality of the bond K, namely firstly the attainment of the target binding force and secondly the presence of a permissible mode of failure.

In FIG. 3, subarea 266 overlaps with sections of the intermediate element 70 and extends here across a section of an edge 71 of the intermediate element 70. Thus, it is again ensured that the forces, when the test section 260 is pulled away, are introduced in such a way that the breaking of the bond K is reliably within the intended region 268 and the fracture profile can be examined.

In addition, FIG. 3 shows, in a dotted line, a further intermediate element 275 which takes the form, for example, of a film, especially of a release film, and may be arranged in sections between the adhesive film 230 and the additional material layer 285. In the subregion 268, the additional material layer 285 in this variant too is bonded to the substrate 20 with mediation via the adhesive film 230. By lifting the additional material layer 285 at its distal end 286 from component 50, the breaking of the bond K in subregion 268, for testing purposes, can alternatively be initiated in an alternative manner proceeding from the bond of the additional material layer 285 to the projection 235 of the adhesive film 230 on the top side thereof. In another variant of the third working example, the further intermediate element 275 may be absent.

Figure 4:
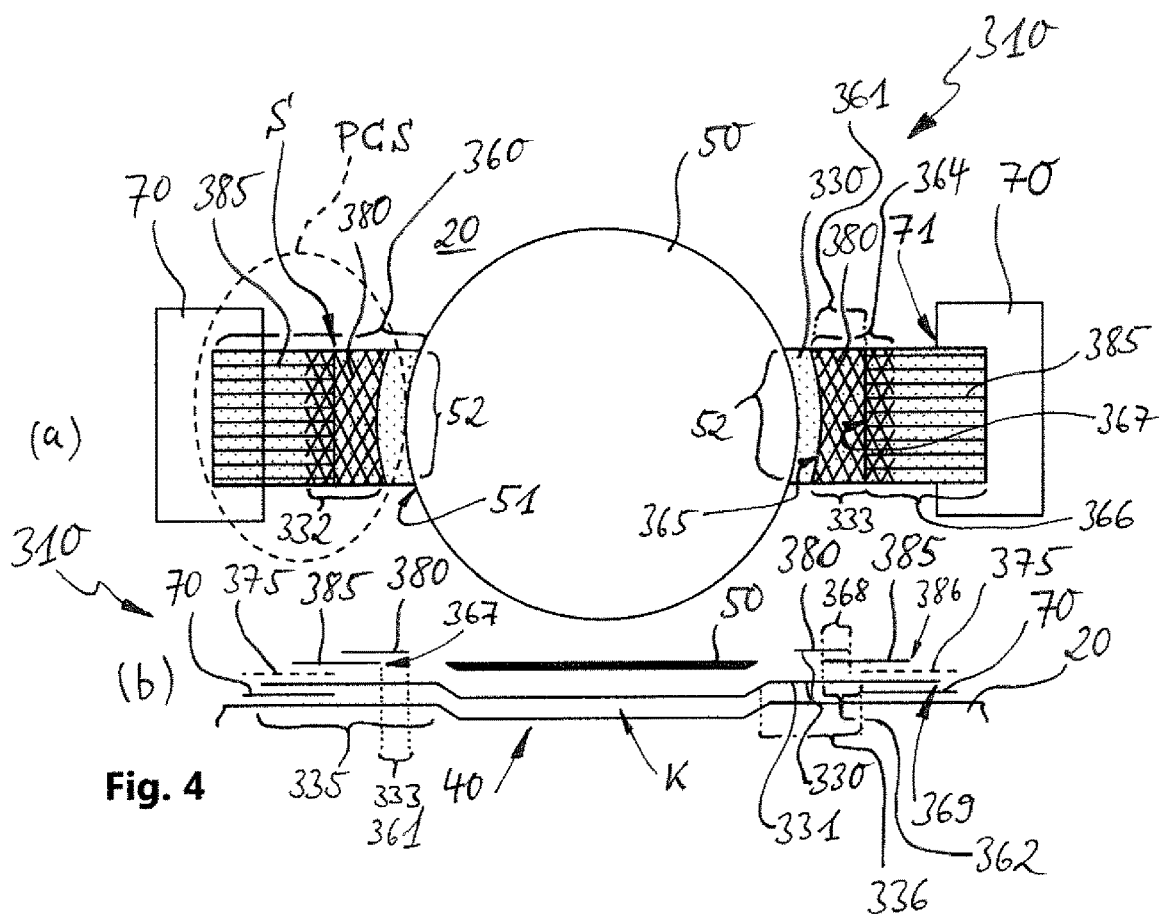
FIG. 4 is a top view (a) and a section view (b) of an arrangement in a fourth working example of the disclosure herein.

An arrangement 310 in a fourth working example is illustrated in FIG. 4. The differences in the fourth working example from the third working example are to be described hereinafter, with additional reference to the above remarks relating to the previous working examples.

The arrangement 310 has a substrate 20, a component 50, two intermediate elements 70 and an adhesive film 330. By the adhesive film 330, a structural adhesive bond 40 of component 50 to the substrate 20 has been formed. The arrangement 310 also has two identical test sections 360. The test sections 360 have each been formed by a projection 335 of the adhesive film 330, with each of the projections 335 extending beyond part 52 of an edge 51 of component 50.

Each of the projections 335 extends by its distal end, viewed from component 50, over regions of the intermediate element 70 and ends at the assigned intermediate element 70. Between the edge 51 and the assigned intermediate element 70, the projection 335 is bonded to the substrate 20 in each case in a region 336 thereof. The test sections 360 each end in FIG. 4 at an end 369 on the intermediate element 70.

The adhesive film 330 of FIG. 4 comprises a starting adhesive film 331. A structure of the adhesive film 330 comprises an internal support structure (again not shown in the Figures) of the starting adhesive film 331. The adhesive film 330 also includes an adhesive which is especially formed with an epoxy resin and is part of the starting adhesive film 331.

In a subarea 332 of the adhesive film 330, in the region of one of the projections 335 in each case, an additional reinforcing component 380 has been applied to the starting adhesive film 331, where, in FIG. 4, the reinforcing components 380 are each in contact with the starting adhesive film 331 only in a subregion 333 that forms part of the subarea 332. The additional reinforcing component 380 has been formed by a textile fabric, especially a nonwoven fabric, a woven fabric or a knitted fabric. The internal support structure of the starting adhesive film 331 (not shown) has also preferably been formed by a textile fabric, especially a nonwoven fabric, woven fabric or knitted fabric.

In the fourth working example, the additional reinforcing component 380 has thus been provided in a first subarea 364 of the test section 360. The first subarea 364 ends between the intermediate element 70 assigned to the test section 360 and component 50 before reaching component 50 in an end 365.

On the projection 335 of FIG. 4, in addition, an additional material layer 385 having elevated breaking strength has been disposed in a second subarea 366 of the test section 360 in each case. On curing of the adhesive film 330, the projection 335 is also bonded to regions of the material layer 385, in a subregion 362 of the test section 360. The additional material layer 385 is of analogous design to the material layer 285 of the third working example, and so reference may be made to the above remarks, also with regard to the state of curing of material layer 385.

The second subarea 366 ends with an end 367 between the intermediate element 70 and component 50. The first subarea 364 overlaps with the second subarea 366 of the test section 360 in an overlap region 368, extends across the end 367 of the second subarea 366 ends with the end 365 between the end 367 and component 50 before reaching component 50.

In the fourth working example, a mechanical strength of a structure comprising the additional reinforcing component 380 and the internal support structure of the starting adhesive film 331 has been matched to a predefined target binding force of a bond K produced with the adhesive film 330 to form the adhesive bond 40 in such a way that—after completion of the bond K—when the adhesive film 330 is pulled away from the substrate 20 by peeling stress on the bond K of the adhesive film 330 in the subregion 333 between the ends 365 and 367 fails when the strength of the bond K attains or exceeds the target binding force, and does not fail in the subregion 333 when the strength of the bond K does not attain the target binding force. More particularly, the structure of the adhesive film 330 here can fail on attainment or exceedance of the target binding force in subregion 333. In other words, in the case of a bond K of good quality, the test section 360 breaks off at an intended break site S at the end 367 of the additional material layer 385 in the reinforced first subarea 364. If the quality of the bond K, by contrast, is insufficient, the test section 360 breaks off at the end or outside the subregion 333, for example shortly before component 50.

Between the end 367 and the edge 51, there is thus a subregion 361 of the test section 360 that coincides spatially with subregion 333 and in which, analogously to the second working example described above, the adhesive attachment can be tested for attainment of the target binding force. In this case, the addition of the additional reinforcing component 380 can serve to modify the mechanical strength of the structure of the adhesive film 330 for adjustment of the mechanical strength of the test section 360 in subregion 361.

When the test section 360 is pulled away from substrate 20 with peeling stress on the bond K, after the test section 360 is lifted away from the intermediate element 70, analogously to the third working example, the bond K between the edge 71 and the end 367 breaks in subregion 362, which again reveals the fracture profile.

The second subarea 366 also overlaps with sections of the intermediate element 70 and extends here across a section of an edge 71 of the intermediate element 70. In the fourth working example too, it is thus ensured that the forces, for example tensile forces, when the test section 360 is pulled away, are initiated in such a way that the breaking of the bond K is reliably within the intended region 362 between the edge 71 and the end 367, and the fracture profile can be examined.

The fourth working example thus also enables assessment of the quality of the bond K using the binding force and using the fracture profile, where the reinforcing component 380 offers a further improvement in matching to the target binding force.

In addition, FIG. 4 shows, in a dotted line, a further intermediate element 375 which takes the form, for example, of a film, especially of a release film and may be arranged in sections between the adhesive film 330 and the additional material layer 385. In the region 362 facing component 50 between the edge 71 and the end 367, the additional material layer 385 in this variant too is bonded to the substrate 20 with mediation via the adhesive film 330. By lifting the additional material layer 385 at its distal end 386 from component 50, the breaking of the bond K, for testing purposes, analogously to the third working example, can be initiated in an alternative manner proceeding from the bond of the additional material layer 385 to the projection 335 of the adhesive film 330 on the top side thereof. In another variant, the further intermediate element 375 may be absent.

Figure 6:
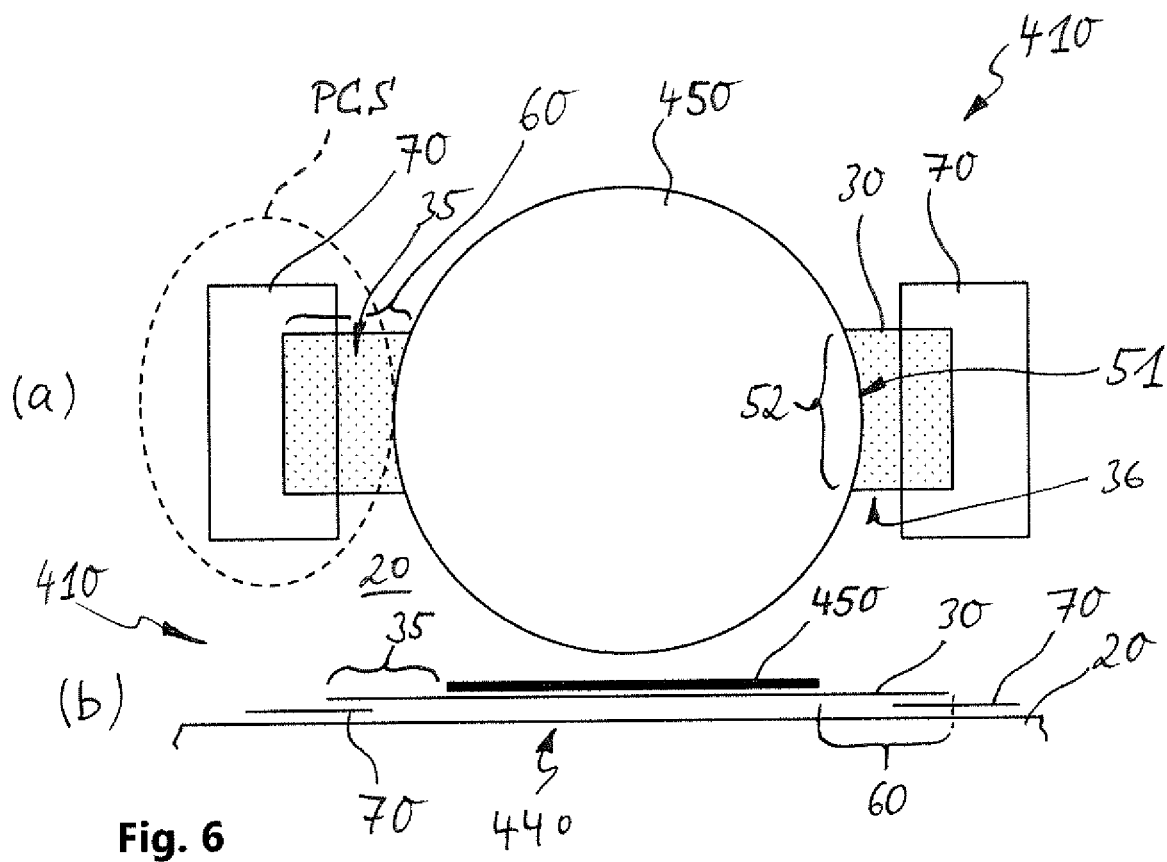
FIG. 6 is a top view (a) and a section view (b) of an arrangement in a fifth working example of the disclosure herein.

FIG. 6 shows an arrangement 410 according to a fifth working example. The arrangement 410 differs from the arrangement 10 according to the first working example in that, in the fifth working example, the substrate 20 has not been provided with a recess for accommodation of component 450 by a material-removing processing operation, and also in that component 450 in FIG. 6 has been formed without tapering or chamfering at the edge face. FIG. 6 illustrates a planned adhesive bond 440 of component 450 to substrate 20. In addition, the arrangement 410 has the same design as the arrangement 10 of the first working example. It will be apparent that the working examples of FIGS. 2, 3 and 4 can also find use in variants analogously to the fifth working example in each case for a planned adhesive bond.

Figure 7:
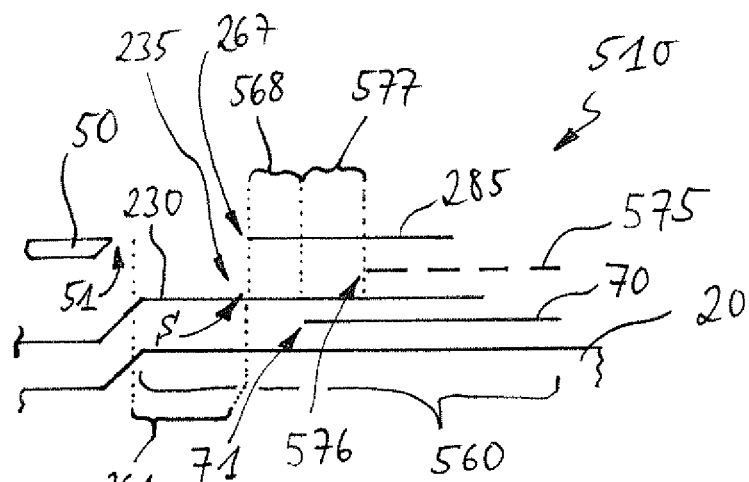
FIG. 7 is a detail of a section view of an arrangement in a sixth working example of the disclosure herein.

FIG. 7 illustrates a schematic of an arrangement 510 according to a sixth working example, which is a variant of the third working example. The differences with respect to the third working example are to be described hereinafter. In addition, reference is made to the above remarks relating to the third working example.

In FIG. 7, rather than the further intermediate element 275, a further intermediate element 575 is provided, which preferably again takes the form of a release film and from which the intermediate element 275 differs merely in that an edge 576 of the further intermediate element 575 facing component 50 has a greater distance from component 50 than the edge 71 of the intermediate element 70 that faces component 50.

In a subregion 568 of the test section 560, as in subregion 268 in FIG. 3, the projection 235 has been bonded to the substrate 20, with simultaneous presence of the additional material layer 285, and it is again possible to produce and subsequently examine a surface profile of the break area. However, in the sixth working example, the projection 235, in a subregion 577 between the edge 71 and the edge 576 that adjoins subregion 568, is bonded to the additional material layer 285, but not to the substrate 20.

In the sixth working example, it is also possible to examine the adhesive attachment between the adhesive film 230 and the additional material layer 285 placed on top, in order to obtain a conclusion as to the adhesive attachment between adhesive film 230 and component 50. For this purpose, the procedure in the sixth working example is as follows: first, the package of the adhesive film 230, the further intermediate element 575 and the additional material layer 285 becomes detached from the lower intermediate element 70 in FIG. 7 and peels off as described for FIG. 3. The test section 560 is designed such that, in the case of good adhesive attachment between the adhesive film 230 and the substrate 20, it then breaks off at the intended break site S at or close to the end 267 facing component 50, i.e. close to the end of the additional material layer 285 facing component 50.

The broken-off part of the test section 560 now also includes at least the subregion 577 in which the adhesive film 230 has been bonded to the additional material layer 285. Now this "residual package" is disassembled at the upper release film 275. This involves peeling the adhesive film 230, the mechanical strength of which is matched to the adhesive attachment to be tested analogously to the manner described above, away from the additional material layer 285. Analogously to the intermediate element 70, the intermediate element 575 facilitates the detachment and gripping of the adhesive film 230 when it is peeled away from additional material layer 285. To make it easier, the broken-off part of the test section 560 can be turned around for this purpose.

According to whether the test section 560 then breaks off or the bond between adhesive film 230 and the additional material layer 285 tears further, it is advantageously also possible to draw conclusions as to the adhesive attachment to the additional material layer 285. This is particularly advantageous when component 50, for instance a repair patch or a component part, and also the additional material layer 285 has been cured even before bonding to the substrate 20 and optionally provided with an appropriate surface pretreatment. In such a case, by the sixth working example, a useful control sample for the attachment between adhesive film 230 and component 50 and also for the effect of any pretreatment of component 50 can be created.

Figure 8:
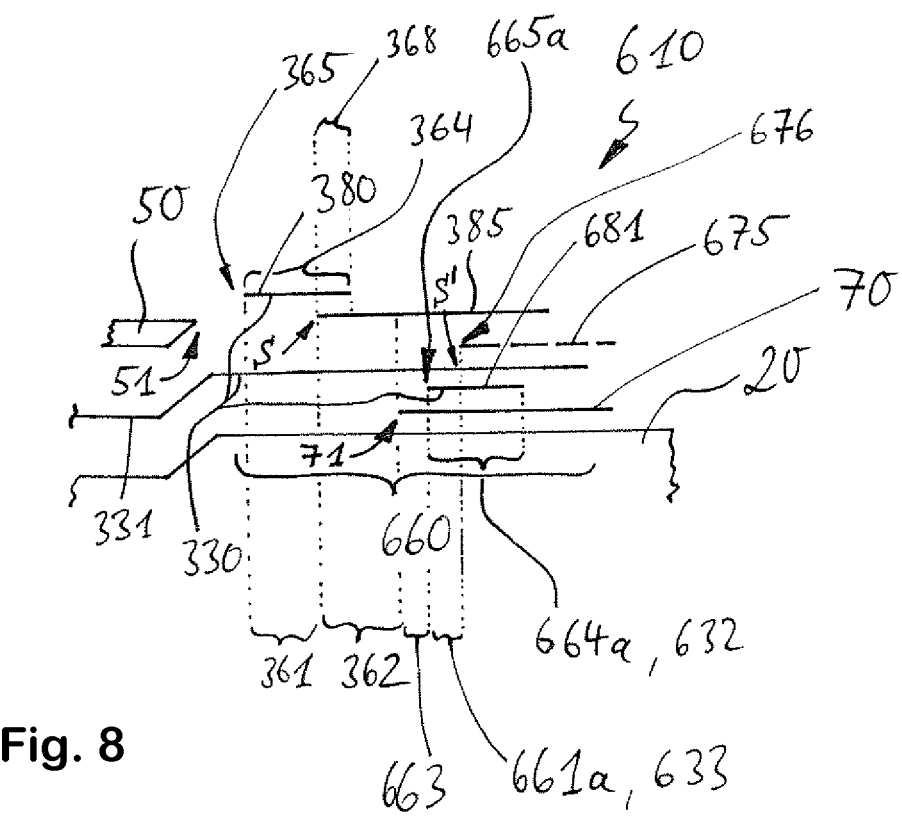
FIG. 8 is a detail of a section view of an arrangement in a seventh working example of the disclosure herein.

FIG. 8 illustrates, in schematic form, an arrangement 610 according to the seventh working example, which is a variant of the fourth working example in which, analogously to the sixth working example, a further intermediate element 675 has been provided. Reference is made to the above elucidations relating to the fourth and sixth working examples and to the intermediate element 575. The seventh working example also enables the testing of the adhesive attachment between the additional material layer 385 and the adhesive film 330.

In the seventh working example, a further reinforcing component 681 has been provided. With regard to design of the reinforcing component 681 and the effect thereof and the mechanical strength of the adhesive film 330 or of the test section 660, reference is made to the above remarks relating to the reinforcement components 180 and 380.

The additional reinforcing component 681 in FIG. 8 is disposed between the lower intermediate element 70 in the Figure and the adhesive film 330 in a third subarea 664a of the test section 660, corresponding to a subarea 632 of the adhesive film 330. The reinforcing component 380 already described for FIG. 4 is disposed with its end 365 in the first subarea 364, with the first subarea 364 in FIG. 8 forming a subarea of the test section 660.

The additional reinforcing component 681 ends at an end 665a of the third subarea 664a that faces component 50 between the edge 71 of the intermediate element facing 70 component 50 and the edge 676 of the further intermediate element 675 facing component 50. In a subregion 661a of the test section 660, corresponding to a subregion 633 of the adhesive film 330, between the end 665a and the edge 676, the adhesive film 330 has thus been reinforced by the additional reinforcing component 681 and additionally bonded by the additional material layer 385. In the subregion 661a, 633, the mechanical strength of the test section 660 is matched to the target binding force of the bond between the adhesive film 330 and the additional material layer 385. In a subregion 663 between the end 665a and the edge 71, the adhesive film 330, however, is not reinforced by the additional reinforcing component 681.

Thus, in the seventh working example, the additional reinforcing component 681 does not affect the testing in the subregions 361 and 362. However, the seventh working example, after the test section 660 has been torn off and turned around as described above by pulling the adhesive film 330 with the reinforcing component 681 away from the additional material layer 385, can enable evidence of adhesive attachment in the direction of the additional material layer 385. The mechanical strength of the test section 660 in the subregion 661a, 633 has been adjusted such that, given good adhesive attachment between the adhesive film 330 and the additional material layer 385, the test section 660 breaks off in the subregion 661a, 633, preferably at an intended break site S' at or close to the edge 676 of the further intermediate element 675, but does not break off in the subregion 661a, 633 when this adhesive attachment does not have the required binding force. The seventh working example can advantageously also find use in cases where component 50 and the additional material layer 385 are already cured.

It will be apparent that the working examples of FIGS. 7 and 8 can each find advantageous use in variants analogous to the fifth working example for a planned adhesive bond, in which case, in FIGS. 7, 8, component 450 in FIG. 6 may be bonded to the substrate 20 rather than component 50.

The test section 160, 260, 360 or 60 in the working examples of FIGS. 2, 3, 4, 6, 7 and 8 can in each case be pulled away analogously to the pulling-away in the first working example, for example using the roller device 91, as elucidated for FIG. 5.

The substrate 20 in all the above-described working examples, prior to execution of the bond K, is in the form of an already cured fiber composite component. Alternatively, however, in variants of the production of a planned assembly group, the substrate 20 could still be in uncured or incompletely cured form, and further curing thereof could be effected, for example, during the curing of the adhesive film 30, 130, 230 or 330.

In some variants of the above-described working examples, it may be preferable to subject the component 50 and the substrate 20, owing to their state of curing, to a preparation of the bonding surfaces, for example by surface grinding, pulling off a peel ply applied beforehand, sandblasting or plasma activation, especially when component 50 and substrate 20 have already been cured. In these variants, the pretreatment of the bonding surfaces is also undertaken in the same way for any additional material layer 285 or 385 present, especially one that has been cured, and also for the region in which the projection 35, 135, 235 or 335 is bonded to the substrate 20.

In the case of a planned adhesive bond, as in FIG. 6 for instance, it may be the case that component 450 has already cured and the substrate 20 is partly as yet uncured or as yet incompletely cured. In the test as to whether adhesive attachment is sufficiently good, it is particularly advantageous when specifically adhesive attachment to already cured elements that may have been subjected to a surface pretreatment can be verified reliably. The use of an additional material layer 285 or 385, as described above for FIGS. 3, 4, 7 and 8, is particularly useful in such a case and is employable both in cases where there is tapering of component 50 and in cases of a planned bonded without tapering, as elucidated by way of example for FIG. 6.

In addition, especially the first to fourth working examples described above can be used in the repair of fiber composite components of aerospace vehicles. If the surface of the substrate 20 which then takes the form, for example, of a fiber composite component of an aircraft for instance is processed prior to the bonding, for example, in a material-removing manner for removal of a lightning guard in the form of a copper mesh by grinding, the removal of material is preferably conducted in the same way on the substrate 20 where the projection 35, 135, 235 or 335 is bonded to the substrate 20. In this way, it is possible to prevent the bond K from being different in the region of component 50 and in the region of test sections 60, 160, 260, 360.

Although the disclosure herein has been described in full above using preferred working examples, it is not limited thereto, but is modifiable in various ways.

More particularly, the disclosure herein is useful in connection with adhesive bonds having one or more fiber composite components or elements, but is also applicable to adhesive bonds of other bonding partners.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

10 arrangement
20 substrate
21 area
22 surface
30 adhesive film
35 projection
36 region (projection)
40 adhesive bond
50 component
51 edge (component)
52 part (edge)
60 test section
69 end (test section)
70 intermediate element
71 edge (intermediate element)
72 distance
90 roller device
91 roller body
110 arrangement
130 adhesive film
131 starting adhesive film
132 subarea (adhesive film)
133 subregion (adhesive film)
135 projection
136 region (projection)
160 test section
161 subregion (test section)
164 subarea (test section)
165 end (subarea)
169 end (test section)
180 reinforcing component
210 arrangement
230 adhesive film
235 projection
236 region (projection)
260 test section
261 subregion (test section)
266 subarea (test section)
267 end (subarea)
268 subregion (test section)
269 end (test section)

275 further intermediate element
285 additional material layer
286 end (additional material layer)
310 arrangement
330 adhesive film
331 starting adhesive film
332 subarea (adhesive film)
333 subregion (adhesive film)
335 projection
336 region (projection)
360 test section
361 subregion (test section)
362 subregion (test section)
364 first subarea (test section)
365 end (first subarea)
366 second subarea (test section)
367 end (second subarea)
368 overlap region
369 end (test section)
375 further intermediate element
380 reinforcing component
385 additional material layer
386 end (additional material layer)
410 arrangement
440 adhesive bond
450 component
510 arrangement
560 test section
568 subregion (test section)
575 further intermediate element
576 edge (further intermediate element)
577 subregion (test section)
610 arrangement
633 subregion (adhesive film)
660 test section
661a subregion (test section)
663 subregion (test section)
664a third subarea (test section)
665a end (third subarea)
675 further intermediate element
676 edge (further intermediate element)
681 further reinforcing component
K bond
PCS process control specimen
R rotation
S intended break or intended fracture site with good bond
S' further intended break or intended fracture site with good bond

The invention claimed is:

1. An adhesive film for a structural adhesive bond to a substrate, the adhesive film having a structure, the structure of the adhesive film taking a form of a carrier structure of the adhesive film, the carrier structure being formed by a textile fabric, and
where, at least in a subregion of the adhesive film, a mechanical strength of the structure has been matched to a predefined target binding force of a bond produced using the adhesive film such that, after completion of the bond, when the adhesive film is pulled away from the substrate or from a material layer with peeling stress on the bond for verification of the adhesive attachment to the substrate or to the material layer, the adhesive film fails with exceedance of the mechanical strength of the structure when strength of the bond attains or exceeds the target binding force, and the adhesive film when pulled apart does not fail at least in the subregion when strength of the bond does not attain the target binding force.

2. The adhesive film according to claim 1, wherein, at least in a subarea of the adhesive film, the structure has been formed with an additional reinforcing component, where the additional reinforcing component has been applied to a starting adhesive film to form the adhesive film or has been introduced into the starting adhesive film, and wherein the mechanical strength matched to the target binding force is a mechanical strength of the structure including the additional reinforcing component.

3. A method of verifying adhesive attachment in a structural adhesive bond to a substrate produced according to claim 1 using an adhesive film having a structure, the structure of the adhesive film taking a form of a carrier structure of the adhesive film, the carrier structure being formed by a textile fabric, wherein, after completion of a bond produced using the adhesive film, for verification of adhesive attachment to the substrate and/or to a material layer, a test section formed by a section of the adhesive film is pulled away from the substrate and/or from the material layer with peeling stress on the bond.

4. An arrangement for verification of an adhesive attachment, having a substrate, a component bonded to the substrate by an adhesive film to form a structural adhesive bond, and at least one test section;
where the test section is formed by a projection of the adhesive film that extends at least beyond part of an edge of the component bonded to the substrate and the projection is bonded to the substrate in some regions; and
wherein a mechanical strength of the test section, at least in a subregion of the test section, is matched to a predefined target binding force of a bond produced using the adhesive film such that, after completion of the bond, when the test section is pulled away from the substrate with peeling stress on the bond, the test section breaks off with exceedance of the mechanical strength thereof when strength of the bond attains or exceeds the target binding force and the test section, when pulled apart, does not break off, at least in the subregion, when strength of the bond does not attain the target binding force.

5. The arrangement according to claim 4, wherein the adhesive film has a structure and at least in the subregion of the test section a mechanical strength of the structure is matched to the target binding force of the bond produced using the adhesive film such that, when the test section is pulled off, the adhesive film fails with exceedance of the mechanical strength of the structure when strength of the bond attains or exceeds the target binding force, and the adhesive film when pulled apart does not fail at least in the subregion when strength of the bond does not attain the target binding force.

6. The arrangement according to claim 4, wherein the arrangement also has an intermediate element spaced apart from the edge of the component bonded to the substrate, and the projection extends over regions of the intermediate element, such that the intermediate element is in regions between the projection and the substrate, where the projection is bonded to the substrate between the edge of the component bonded to the substrate and the intermediate element, and where the projection is readily detachable from the intermediate element.

7. The arrangement according to claim 4, comprising an additional reinforcing component at least in a first subarea of the test section.

8. The arrangement according to claim 7, wherein the arrangement also has an intermediate element spaced apart from the edge of the component bonded to the substrate, and the projection extends over regions of the intermediate element such that the intermediate element is in regions between the projection and the substrate, where the projection is bonded to the substrate between the edge of the component bonded to the substrate and the intermediate element, and where the projection is readily detachable from the intermediate element, and wherein the first subarea ends between the intermediate element and the component bonded to the substrate before reaching the component bonded to the substrate.

9. The arrangement according to claim 7, wherein the arrangement also has an intermediate element spaced apart from the edge of the component bonded to the substrate, and the projection extends over regions of the intermediate element such that the intermediate element is in regions between the projection and the substrate, where the projection is bonded to the substrate between the edge of the component bonded to the substrate and the intermediate element, and where the projection is readily detachable from the intermediate element, and wherein the first subarea overlaps with at least sections of the intermediate element and extends across a section of an edge of the intermediate element.

10. The arrangement according to claim 4, wherein an additional material layer with elevated breaking strength is disposed on the projection in a second subarea of the test section.

11. The arrangement according to claim 10, wherein the arrangement also has an intermediate element spaced apart from the edge of the component bonded to the substrate, and the projection extends over regions of the intermediate element such that the intermediate element is in regions between the projection and the substrate, where the projection is bonded to the substrate between the edge of the component bonded to the substrate and the intermediate element, and where the projection is readily detachable from the intermediate element, and wherein the second subarea ends between the intermediate element and the component bonded to the substrate before reaching the component bonded to the substrate, and wherein the second subarea overlaps with at least sections of the intermediate element and extends across a section of an edge of the intermediate element.

12. The arrangement according to claim 4, comprising an additional reinforcing component at least in a first subarea of the test section, wherein an additional material layer with elevated breaking strength is disposed on the projection in a second subarea of the test section, and wherein the first subarea overlaps with sections of the second subarea, the first subarea extends across one end of the second subarea and the first subarea ends between the end of the second subarea and the adhesive-bonded component before reaching the adhesive-bonded component.

13. The arrangement according to claim 4, wherein the intermediate element comprises a release film, and/or wherein the component bonded to the substrate comprises a laminate or a laminate ply.

14. A method of verifying an adhesive attachment, the method comprising:
   arranging a substrate, a component to be bonded to the substrate and an adhesive film such that a section of the adhesive film is arranged between the substrate and the component to establish a structural adhesive bond and the adhesive film extends over at least part of an edge of the component and forms a projection;
   curing at least the adhesive film; and
   peeling off a test section formed by the projection of the adhesive film that extends at least across part of the edge of the component from the substrate.

* * * * *